United States Patent [19]

Chanasyk et al.

[11] Patent Number: 5,573,688
[45] Date of Patent: Nov. 12, 1996

[54] CONVECTION/INFRARED SOLDER REFLOW APPARATUS

[75] Inventors: Albert Chanasyk, Hampton Falls, N.H.; Walter J. Hall, Waltham, Mass.; J. Robert Maxwell, Londonderry, N.H.; Russell G. Shaw, Contoocook, N.H.; Roy J. Palhof, Somersworth, N.H.; Phillip D. Bourgelais, Newmarket, N.H.

[73] Assignee: Vitronics Corporation, Newmarket, N.H.

[21] Appl. No.: 270,822

[22] Filed: Jul. 5, 1994

Related U.S. Application Data

[62] Division of Ser. No. 945,232, Sep. 15, 1992, Pat. No. 5,345,061.

[51] Int. Cl.⁶ .................................................. B23K 1/00
[52] U.S. Cl. .......................... 219/388; 219/400; 228/219; 228/180.1; 228/232
[58] Field of Search ................................ 219/388, 400, 219/85.13, 85.22; 228/219, 220, 180.1, 232, 227

[56] References Cited

U.S. PATENT DOCUMENTS

| | | |
|---|---|---|
| 4,448,578 | 5/1984 | Brunet et al. ............................. 432/72 |
| 4,565,917 | 1/1986 | Furtek . |
| 4,580,716 | 4/1986 | Barresi et al. .......................... 228/219 |
| 4,654,502 | 3/1987 | Furtek . |
| 4,698,774 | 10/1987 | Abe et al. . |
| 4,771,929 | 9/1988 | Bahr et al. . |
| 4,832,249 | 5/1989 | Ehler . |
| 4,833,301 | 5/1989 | Furtek . |
| 4,876,437 | 10/1989 | Kondo . |
| 4,909,430 | 3/1990 | Yokota . |
| 4,912,857 | 4/1990 | Parent et al. . |
| 4,938,410 | 7/1990 | Kondo . |
| 5,003,160 | 3/1991 | Matsuo et al. . |
| 5,069,380 | 12/1991 | Deambrosio ............................. 219/388 |
| 5,090,651 | 2/1992 | Mittag ..................................... 219/388 |
| 5,125,556 | 6/1992 | Deambrosio ............................. 228/219 |
| 5,141,147 | 8/1992 | Yokota .................................... 228/219 |
| 5,145,100 | 9/1992 | Kondo ..................................... 228/219 |
| 5,203,487 | 4/1993 | Mishina et al. .......................... 219/388 |
| 5,440,101 | 8/1995 | Cox et al. ................................ 219/388 |

FOREIGN PATENT DOCUMENTS

| | | | |
|---|---|---|---|
| 54-9852 | 5/1979 | Japan . | |
| 56-74367 | 6/1981 | Japan ..................................... | 219/388 |
| 60-7193 | 1/1985 | Japan . | |
| 63-174778 | 7/1988 | Japan ..................................... | 228/219 |
| 3-8564 | 1/1991 | Japan ..................................... | 228/219 |
| 2027062 | 2/1980 | United Kingdom ................... | 228/219 |
| WO91/04824 | 4/1991 | WIPO . | |

OTHER PUBLICATIONS

SM Series Technical Data and Performance Report (Exhibit A of Zarrow Declaration)*.
New Product Release (See Exhibit B of Zarrow Declaration)*.

*Primary Examiner*—John A. Jeffery
*Attorney, Agent, or Firm*—Wolf, Greenfield & Sacks, P.C.

[57] ABSTRACT

Apparatus for soldering surface mounted devices to printed circuit boards utilizing a combination of forced convection and infrared radiation. Fans are disposed in each heating zone which force gas through a heating plate which heats the air, emits infrared radiation for heating of printed circuit boards, and establishes a flow pattern for the gas. Flows are controlled in each zone by selectively introducing unheated gas into each zone, and by selectively exhausting gas from each zone. The volume of gas introduced and exhausted from each zone can be controlled. Closures are provided in the return channels to the low pressure side of the fan for controlling the volume of gas recirculated from the conveyor. Flow is controlled such that cooler air is always introduced into the zones which have a lower temperature and is exhausted from zones which have higher temperatures. As a consequence, the gas flow between zones can be controlled to maintain desired zone definition, to decouple zones from one another and to prevent overheating in any one zone. In this manner, the temperatures within each zone, and thus the temperatures of the printed circuit boards can be carefully controlled.

15 Claims, 10 Drawing Sheets

CONVECTION/INFRARED SOLDER REFLOW APPARATUS

This application is a division of application Ser. No. 07/945,232 filed Sep. 15, 1992, now U.S. Pat. No. 5,345,061.

FIELD OF THE INVENTION

This invention relates generally to apparatus for reflow soldering of surface mounted devices to printed circuit boards, and more particularly to such apparatus in which the infrared heating is supplemented by forced convection.

BACKGROUND OF THE INVENTION

Components are commonly mounted onto a printed circuit board (PCB) using reflow soldering in conjunction with PCB's without through-holes. A preferred type of oven for reflow soldering is one which uses nonfocused infrared energy combined with natural convection to heat the board and the components, as well as the solder, without damaging the board or the components. A preferred method and apparatus are set forth in the following U.S. Patents which are assigned to the assignee of the present application: U.S. Pat. Nos. 4,565,917; 4,654,502; and 4,833,301. Each of these patents describes a system and method in which infrared energy is generated by panels at a desired peak wavelength, or temperature, which can be accurately controlled. The hot panels also cause an exchange of heat through naturally-occurring convection.

In the foregoing system, a conveyor transports the PCBs with the components and solder paste already placed thereon through a plurality of heating zones. Typically, each zone includes a heater panel both above and below the conveyor. Each zone is independent of the other zones, and the panels in each zone can be heated to a temperature independently of the other zones.

In reflow soldering, typically, a ramp-soak-spike heater panel recipe is used, in which the temperature of the panels in the first zone or zones (the ramp zone) is higher than the temperatures of the panels in at least one subsequent, intermediate zone or zones (soak zone), and in which the heater panel temperatures in the last zone or zones (the spike zone), are again increased above that of the soak zone. In the ramp zone, the solder flux is activated, and volatile flux components are driven off. The temperature of the heater panels in the soak zone or zones is lower than that in either the ramp or spike zones. The purpose of the "soak" zone is to allow larger components and areas in the center of the PCB which heat more slowly to reach the same temperature as the smaller components and edges of the PCB, respectively, which heat more rapidly. Also, cleaning of oxydized surfaces is promoted. In the spike zone, the temperature is increased rapidly to just above the melting temperature of the solder to produce the desired solder reflow. Thereafter, the PCBs are rapidly cooled to cause solidification of the solder.

In recent years, it has been determined that it is desirable to supplement the infrared and natural convection heating of the PCBs by using forced convection currents. Forced convection increases the heat exchange coefficient, and, therefore, increases the rate at which the PCBs and the components are heated, thereby increasing the throughput. In addition, forced convection can assist in reducing hot spots, and the shadowing effect occasionally noted with infrared panels. As a result, more uniform heating of the PCBs and the components is produced and more uniformly satisfactory results and better solder joints are achieved without damage due to overheating of small components.

A number of systems have been introduced to the market in which the infrared heating of the PCBs is supplemented with forced convection. However, in systems using forced convection, zone definition and accurate temperature control is oftentimes very difficult to maintain. Air flowing in one heated zone has a tendency to flow into or heat adjacent zones in an uncontrolled manner. Typically, air from hotter zones flows into cooler zones creating the potential of overheating the cooler zones. Also, heat transfer between zones occurs through conduction and radiation.

Because the middle or "soak" zone typically is sandwiched between two hotter zones, heat tends to be transferred to the soak zone from the surrounding warmer zones. Most ovens have no cooling capability, so that once a zone has become overheated, it is difficult to reduce the temperature to a desired level. Such uncontrolled heat exchange reduces the accuracy of the temperature control of each zone. This reduction in accuracy could impact the uniform PCB temperatures and, thus, the integrity of the solder joints could be affected or the PCB or components could be damaged.

Examples of prior art, convection-assisted systems are found in U.S. Pat. No. 4,909,430, U.S. Pat. No. 4,876,437, U.S. Pat. No. 4,938,410, and International Publication No. WO 91/04824. These, and other systems, typically recirculate the air through the use of a fan, drawing the air over heating coils or through a heated panel, and this heated air is then drawn over or through the PCBs on the conveyor. U.S. Pat. No. 4,938,410 shows a system in which fans are disposed both above and below the conveyor, and air is circulated past the PCBs in a generally horizontal direction, rather than vertically. Each of the foregoing apparatus recirculates heated air or some other gas exhausted from a zone or zones back to the intake side the zone or zones for reheating and further heating of the PCB's.

It is believed that each of these systems suffers from some degree of difficulty in controlling the temperature within each zone due to uncontrolled heat exchange between the zones, particularly as recirculation rates are increased.

Accordingly, it is an object of the present invention to provide better zone definition within a forced convection-assisted infrared solder reflow apparatus.

It is another object of the present invention to provide better control of the gas flow between zones in a forced convection-assisted infrared solder reflow apparatus.

It is another further object of the present invention to provide more precise temperature control of the gas within each zone of a forced convection assisted infrared solder reflow apparatus.

SUMMARY OF THE INVENTION

This invention relates generally to an improved apparatus for reflow soldering of surface mounted devices to printed circuit boards utilizing forced convection-assisted heaters in which the gas flow within a zone and between zones is carefully controlled to provide precise temperature control and zone definition.

The apparatus of this invention includes a conveyor for carrying a product to be processed. The apparatus is divided into a plurality of zones. Each zone has its own gas circulation means, its own intake and exhaust ports, a heated perforated plate through which a gas is forced, ducts for a return flow, and a temperature control. The intake ports are coupled directly to a source of unheated, fresh gas and not to the return flow from any of the zones.

Typically, air, or another gas, is forced through the perforated, heated metal plate onto a product load on a conveyor and is drawn by the gas circulation means through the return ducts to the low pressure side of the gas circulation means where the gas is then forced again through the heated plate. Some of the gas may be exhausted through the exhaust port after return to the air circulation means, and the air circulation means replaces this exhausted gas with unheated gas from the intake port. The entrances to the return ducts include closures which are adjustable to allow control of the volume of gas flow therethrough. In addition, the intake and exhaust ports are provided with valves or other apparatus for controlling the flow of gas into and out of each zone. This combination of closures to control the sizes of the entrances to the return ducts and the provision of intake and outlet ports in each zone allows precise control of gas flow within the oven plus accurate control of the gas temperature in each zone.

To maintain the desired zone definition and proper control of the gas temperature in each zone, it has been found desirable to produce a net flow of the gas out of the soak zones and into the ramp and spike zones. In addition, for best zone definition, for proper temperature control in the soak zones, or other zones in which the temperature must be maintained at a lower level than in adjacent zones, and for minimizing overheating, it has been found desirable to cool the soak or other cooler zones by drawing unheated gas into these zones through associated intake ports and thereafter heating the gas to the desired temperatures. This gas flow pattern is desirable where no cooling apparatus is provided.

This apparatus is particularly useful for nitrogen atmospheres. It provides the proper zone definition, control and uniformity in each zone required for optimal solder reflow and better control of the PCB temperatures.

BRIEF DESCRIPTION OF THE DRAWINGS

The objects, advantages and features of this invention will be more clearly appreciated from the following detailed description when taken in conjunction with the accompanying drawings in which.

DETAILED DESCRIPTION OF THE PREFERRED EMBODIMENTS

Figure 1:
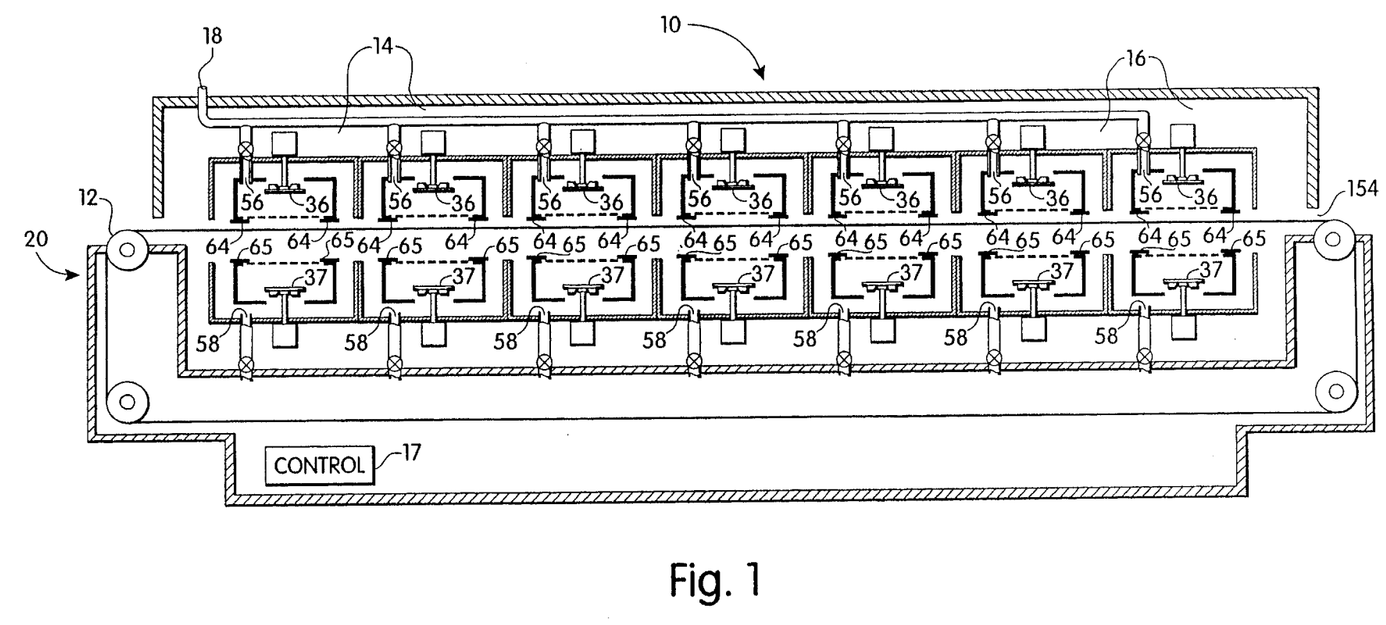
FIG. 1 is a cross-sectional side view showing an exemplary solder reflow apparatus of this invention.

With reference now to the drawings, and more particularly to FIG. 1 thereof, a typical apparatus 10 for solder reflow of surface mounted devices to printed circuit boards in accordance with this invention will be described. Apparatus 10 includes housing 20, an endless conveyor 12, a plurality of heating zones 14, a plurality of cooling zones 16, exhaust duct 18, and control 17. Control 17 typically includes one or more programmable microprocessors and maintains the temperatures in each zone at the desired levels using feedback from temperature sensors associated with each heater plate. While five heating zones and two cooling zones are shown in FIG. 1, it should be understood that these numbers are exemplary only, and that the numbers of heating and cooling zones may be either greater or less than these values. For example, the number of heating zones could be as few as three or as large as twelve or more. However, each heating zone generally is substantially identical to the other heating zones, except as described hereinafter with respect to alternative embodiments. Similarly, the number of cooling zones may be 1, 2, 3 or more depending upon the needs of the particular user. Each of these cooling zones is typically identical to other cooling zones. Also, the heating and cooling zones typically, although not necessarily, are identical to one another. This configuration allows the user to change a heating zone to a cooling zone, or, vice versa, as necessary.

The apparatus of FIG. 1 is specifically adapted to utilize the ramp-soak-spike heat panel recipe as previously discussed, although it may be programmed to use other temperature recipes. While the actual number of zones will vary from application to application, typically in a five-zone system, where air is used, the first two zones form the ramp part of the heating recipe, the second two zones form the soak part of the recipe, while the fifth zone is the spike zone. If nitrogen is used, typically the first zone is a ramp zone, the next three zones are soak zones, while the last zone is a spike zone. In ovens which have ten zones, the first three or four zones are ramp zones, the last one or two zones are spike zones, while the remainder of the zones between the ramp and spike zones are soak zones.

Figure 2:
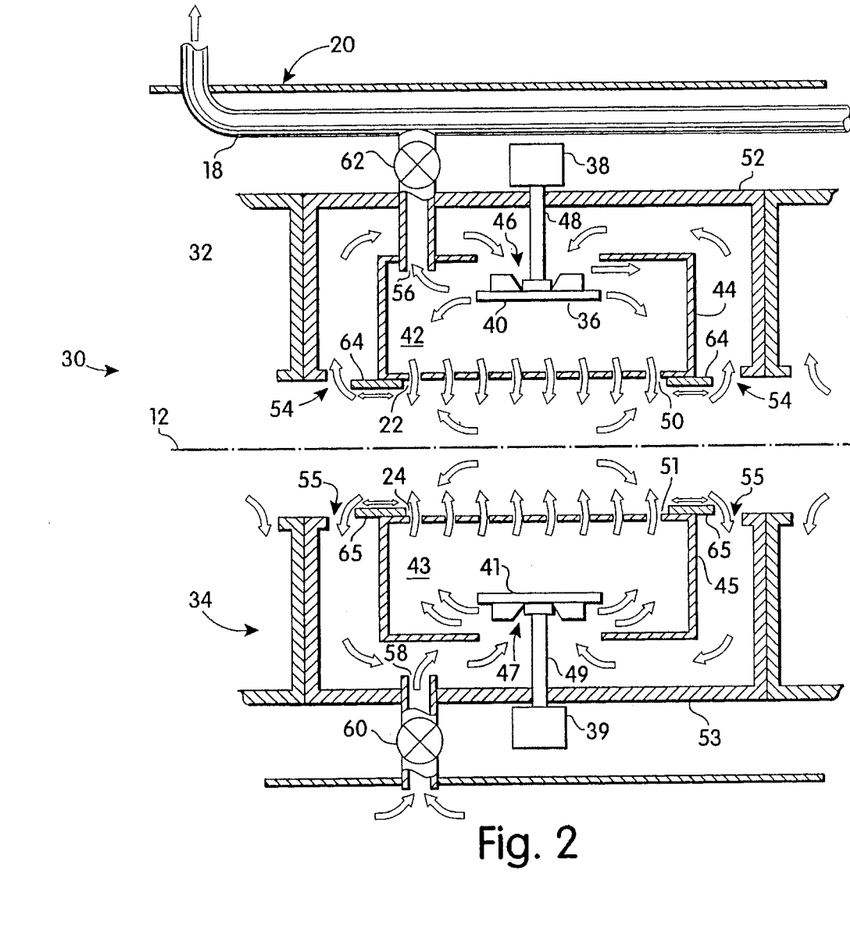
FIG. 2 is a cross-sectional side view of an exemplary heating zone of the apparatus of FIG. 1 showing the gas flow therein.

A typical zone 30, which can be used to either heat or cool a product load, will now be described with particular reference to FIG. 2. Each zone 30 preferably comprises an upper heater cell 32 disposed above conveyor 12 and a lower heater cell 34 disposed below conveyor 12. Heater cells 32 and 34 each have a dedicated gas circulation mechanism, such as a fan 36 and 37, respectively, which is powered by motors 38 and 39, respectively. Fans 36 and 37 each include a blade 40 and 41, respectively, which rotates within a plenum chamber 42 and 43, respectively. Chambers 42 and 43 are each formed by respective solid walls 44 and 45, which extend along the sides of the chamber and along a portion of the chamber facing respective motors 38 and 39. An opening 46 and 47 is formed in respective walls 44 and 45 through which pass shafts 48 and 49, respectively, of fans 36 and 37. Disposed on the side of each chamber 42 and 43 facing conveyor 12 is a heater plate 50 and 51, respectively. Each heater plate 50 and 51 has a plurality of apertures 220 and 222, respectively, through which gas may pass. Each heater plate 50 and 51 includes a heating element for heating of the plate and gas passing through the plate, as will be more fully described. Heater plates 50 and 51 are in closely spaced, confronting relation, and conveyor 12 is disposed between plates 50 and 51.

Surrounding each chamber 42 and 43, and spaced from respective walls 44 and 45, is a housing 52 and 53 which, along with walls 44 and 45 help to define return flow apertures 54 and 55 on each side of respective chambers 42 and 43. Extending into housing 53 is an intake port 58 which directs external unheated gas into the low pressure side of fan 37. It is through openings 46 and 47 that gas is drawn into respective chambers 42 and 43 from a low pressure side of the fan to a high pressure side of the fan. The low pressure side of each fan 36 and 37 typically is the volume defined by walls 44 and 45 and respective housings 52 and 53 and respective openings 46 and 47. The high pressure side of each fan 36 and 37 typically is the valome within respective chambers 42 and 43. Disposed in port 58 is apparatus such as a valve 60 which permits regulation of the volume of air entering port 58 and, thus, cell 34.

Disposed in cell 32, and extending through housing 52 and walls 44 and into plenum chamber 42, is an exhaust port 56. Exhaust port 56 includes apparatus such as a valve 62 for regulating the volume of air exiting chamber 42. Exhaust port 56 is coupled to exhaust duct 18, as shown in FIG. 1, for exhausting gases from cell 32 from the high pressure side of fan 36 externally of housing 20. Associated with each return flow aperture 54 and 55 is an associated respective closure 64 and 65, which is adjustable for controlling the size of apertures 54 and 55, respectively, to thereby regulate the volume of gas returning to the low pressure side of the fan. Typically, closures 64 and 65 are slides whose position can be adjusted to control the sizes of respective apertures 54 and 55.

In operation, PCB's on conveyor 12 are heated both by the gas flow and by infrared radiation emitted by heater plates 50 and 51. In each zone 30, fresh, typically unheated, gas from a source external of chamber 43 is drawn into lower cell 34 through intake port 58. If desired, nitrogen or some other gas can be supplied directly to intake port 58 from a source, or air can be drawn from the surrounding environment. This gas is drawn into the low pressure side of the fan, and into a relatively high pressure plenum chamber 43 by the blades on fan 37. Thereafter, this gas is forced through the perforated plate 51 which plate 51 heats the gas. In the upper cell 32, gas is drawn into the low pressure side of fan 36 through aperture 54, and passes through fan 36 and into plenum chamber 42. Thereafter, the gas is heated as it is forced through apertures 220 in heater plate 50.

The gas heats the printed circuit boards, and a certain amount of the gas is returned to the upper cell 32 through apertures 54, while other amounts of the gas are returned to lower cell 34 through apertures 55. Some of the gas that returns to upper cell 32 and plenum chamber 42 is exhausted through exhaust port 56. Depending on how valves 60 and 62 are adjusted, typically there is a net flow of gas from lower cell 34 into upper cell 32 and out through exhaust port 56. This flow correspondingly produces an influx of fresh gas through intake port 58. This net influx of cooler gas into the system means that the incoming gas typically has a temperature below the temperatures of heater plates 50 and 51. Since only cooler gas is supplied, the gas temperature is always being increased to the desired temperature. Since only heating elements are provided and there is no means for cooling the gas, this approach allows better control of the gas temperature and, thus, of the temperatures of the printed circuit boards on conveyor 12. Moreover, by controlling the net influx of cooler gas, heating of the gas and various walls and surfaces within zone 30 by heat emitted by adjacent zones can be better accommodated for more precise zone temperature.

Figure 3:
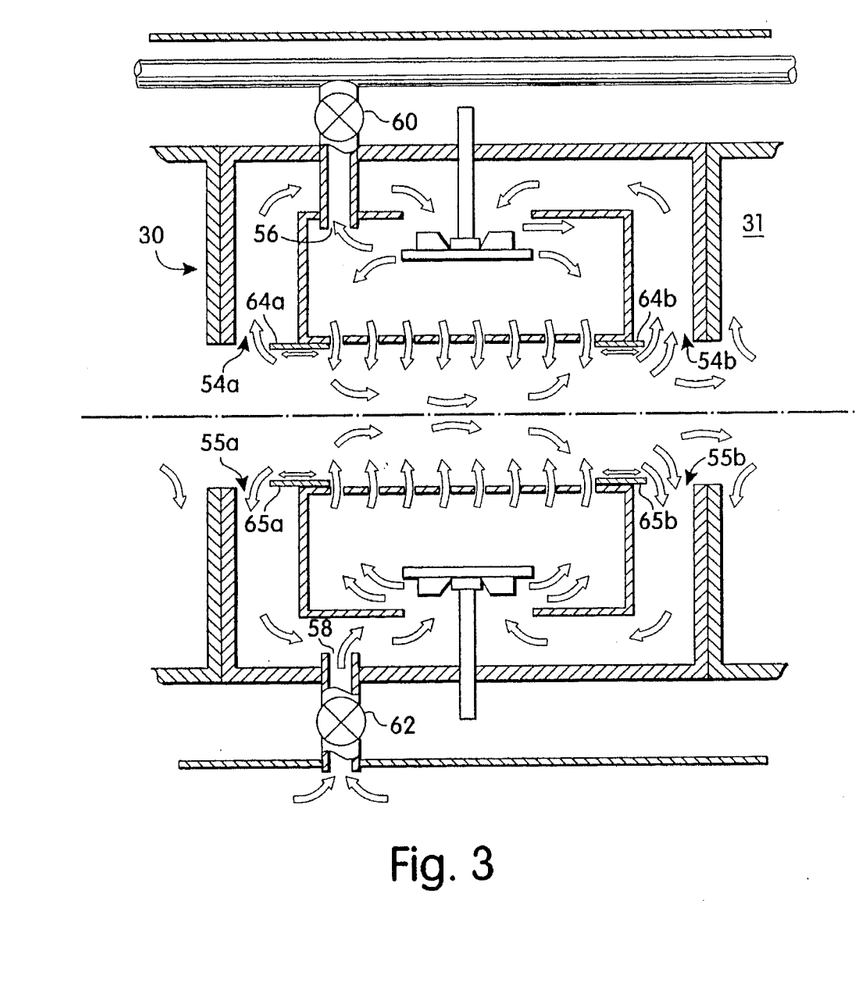
FIG. 3 is a cross-sectional side view of an exemplary heating zone of the apparatus of FIG. 1 illustrating a variable aperture for the return duct.

Another feature of this invention is illustrated with particular reference to FIG. 3. In FIG. 3, like numbers are used for like parts, where applicable. FIG. 3 shows closures 64 and 65 adjusted in such a manner as to produce a net flow of gas out of zone 30 and into adjacent zone 31. Closures 65a and 64a are adjusted to restrict the size of associated return flow apertures 54a and 55a, while closures 64b and 65b are allowed to remain in a fully open position, so that aperture 54b is larger than aperture 54a, and aperture 55b is larger than aperture 55a. As a consequence, less gas returns to chambers 42 and 43 through apertures 54a and 55a than through apertures 54b and 55b. This imbalance produces a net gas flow from left to right, as shown in FIG. 3, within zone 30.

The volume of gas flow may be controlled by controlling the sizes of apertures 54a, 54b, 55a and 55b, and by controlling the volume of air introduced into the zone through port 58 and exhausted through port 56. For example, if the volume of gas introduced through port 58 into zone 30 is increased over the amount of gas exhausted through port 56, and if closures 65a and 64a are configured as shown in FIG. 3, a net gas flow out of zone 30 and into zone 31 would be produced. The volume of gas moving out of zone 30 can be decreased by increasing the amount of gas exhausted through port 56. Also, the direction of gas flow can be changed by, for example, closing closure 64b and 65b and opening closures 64a and 65a, to produce a net flow from right to left as shown in FIG. 3. It is apparent that by adjusting valves 60 and 62 and closures 64a, 64b, 65a and 65b, the volume and direction of gas flow in any one zone can be controlled to produce the results desired.

Figure 4:
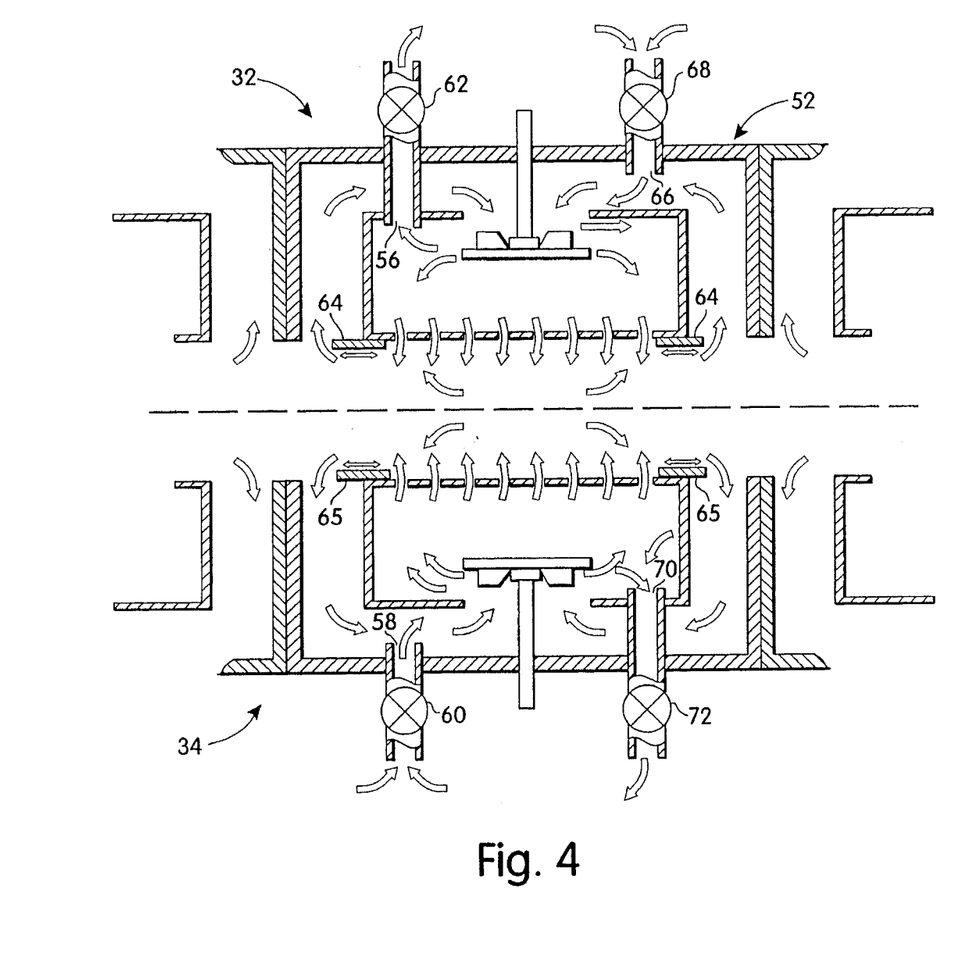
FIG. 4 is a cross-sectional side view of an alternative embodiment of a typical heating zone of the apparatus of FIG. 1.

An alternative embodiment of a heating zone will now be described with particular reference to FIG. 4. Like numbers are used for like parts, where applicable. In FIG. 4, upper cell 32 and lower cell 34 each have an intake port and an exhaust port. Intake port 58 of cell 34 in FIG. 4, along with associated valve 60, are identical to that shown in FIG. 2. Similarly, in FIG. 4, exhaust port 56 in cell 32, along with associated valve 62 are identical to that shown in FIG. 2. Upper cell 32 is provided with an additional intake port 66 and an associated valve 68. As with intake port 58, intake port 66 extends through wall 52 to deliver gas to the low pressure side of fan 36, but does not penetrate into chamber 42. Lower cell 34 is provided with exhaust port 70, which is similar to exhaust port 56. Exhaust port 70 penetrates through wall 53 and wall 45 and exhausts gas from chamber 43. A valve 72 is provided for regulating the volume of gas exhausted through port 70. Exhaust port 70 for each zone 30 is connected to an exhaust duct (not shown) which removes exhausted gases externally of housing 20. The provision of ports 66 and 70 allows greater flexibility in controlling the amount of external gas entering each zone and the amount of gas exhausted from each zone and in directing the flow of gas within housing 20.

Figure 5:
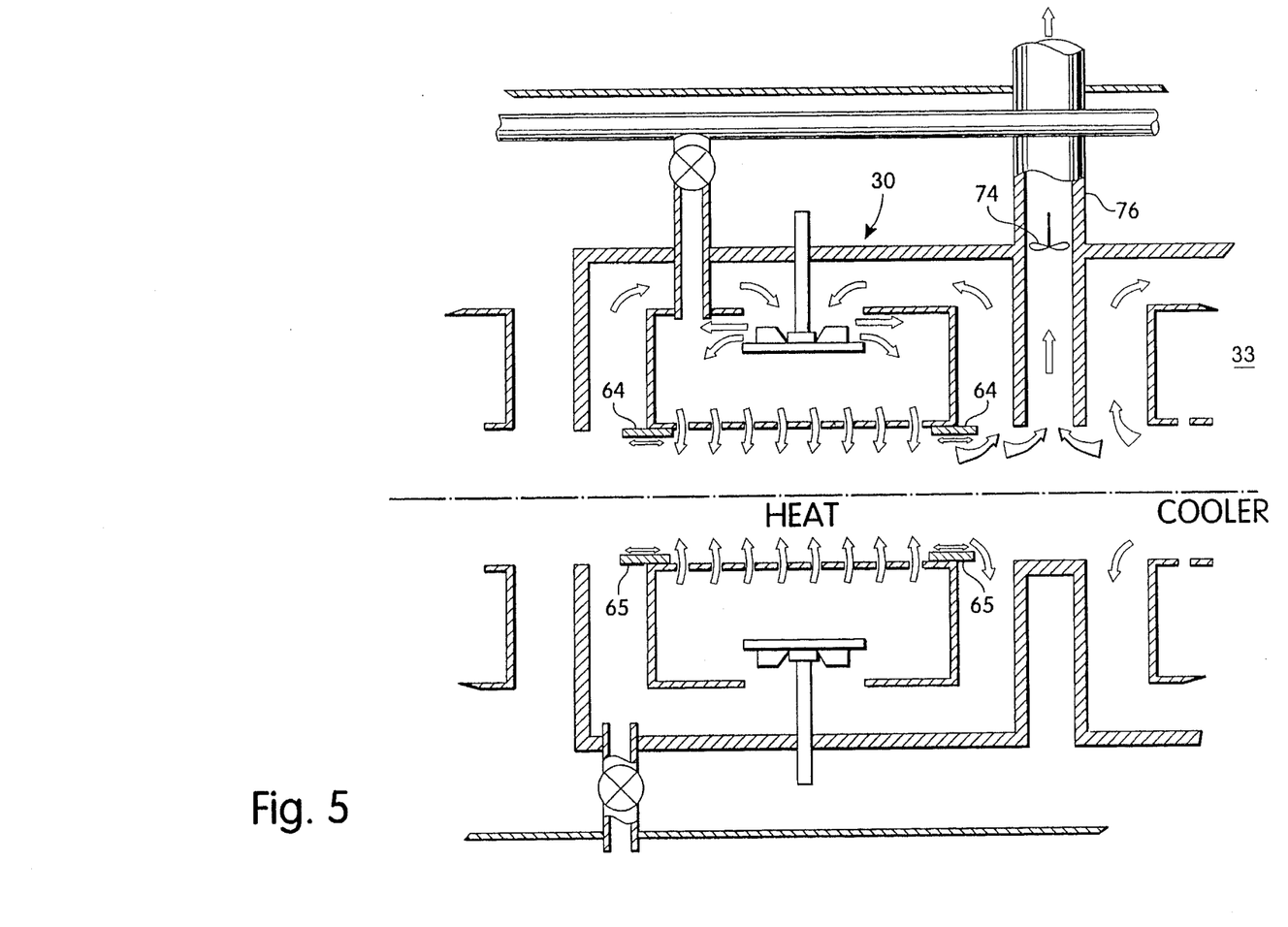
FIG. 5 is a cross-sectional side view of another embodiment of the apparatus of FIG. 1.

Another embodiment of this invention will now be described with particular reference to FIG. 5. Like numbers are used for like parts, where applicable. In FIG. 5, an exhaust tube 74 is provided at the boundary between two adjacent zones 30 and 33, in apparatus 10. In FIG. 5, heating zone 30 is identical in every respect to heating zone 30, as shown in FIG. 2. Zone 33 may be either a heating zone or a cooling zone, but in either event, zone 33 is maintained at a temperature below that of zone 30. A positive exhaust is maintained in exhaust tube 74, such as by a fan 76. As a consequence, heated gas from zone 30, and somewhat cooler gas from zone 33, are both drawn into exhaust pipe 74 and are exhausted from housing 20. By maintaining such a positive exhaust between adjacent zones, zone definition is enhanced, and heat exchange between hotter zone 30 and the cooler zone 33, whether through convection, radiation or conduction, is minimized. In addition, exhaust pipe 74 causes cooler gas to be drawn into zone 33 through an inlet port (not shown) to cause further cooling of zone 33 and to prevent overheating thereof. In one embodiment of FIG. 5, zone 30 is a spike zone and zone 33 is a cooling zone. In this embodiment, unheated, ambient gas is drawn into zone 33 through exit 154 of conveyor 12 in housing 20 (FIG. 1.). The cooler gas drawn into zone 33 is recirculated by the fan in the zone before being exhausted through exhaust pipe 74.

Figure 6:
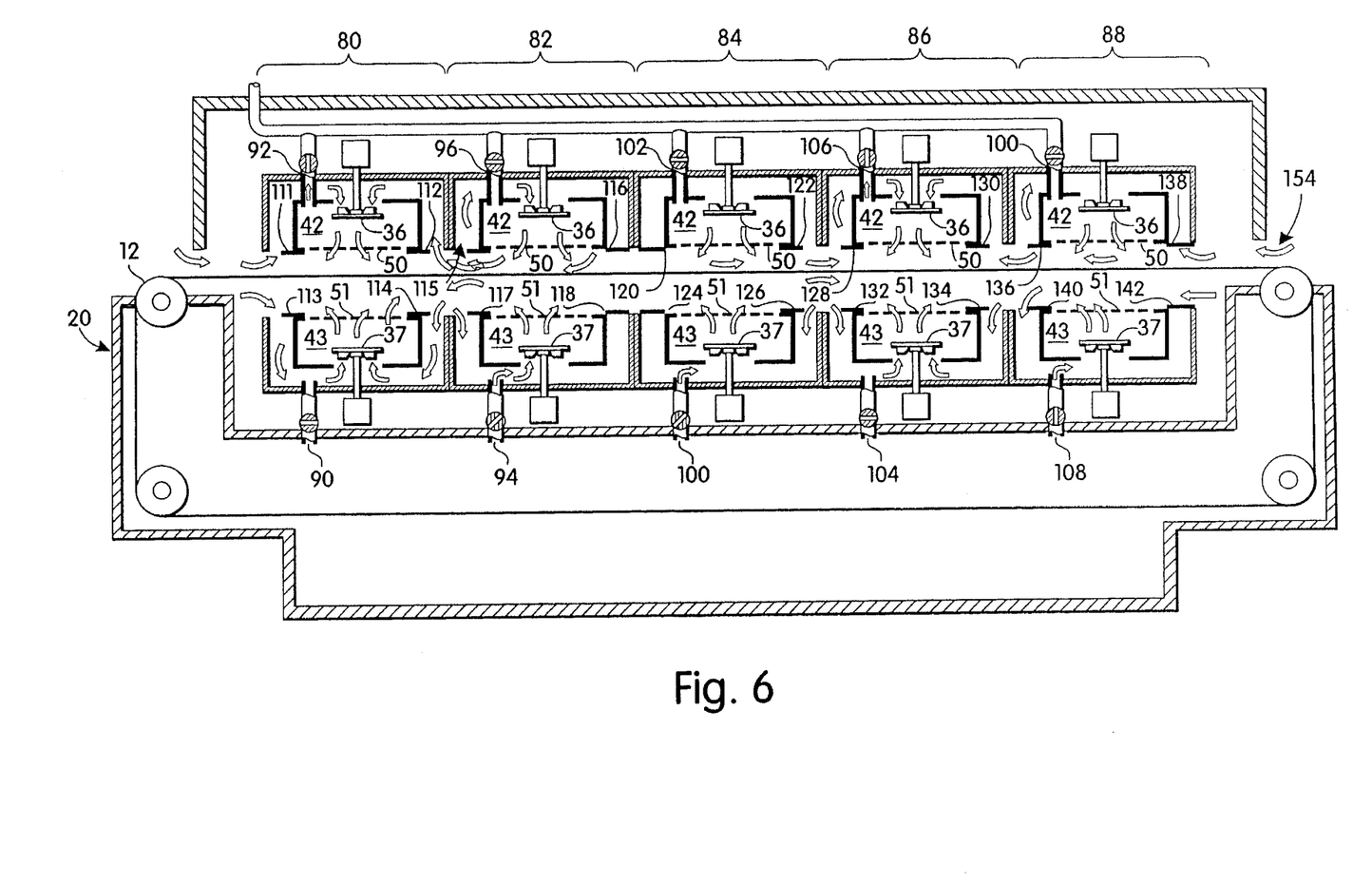
FIG. 6 is a cross-sectional side view of the apparatus of FIG. 1 showing a preferred gas flow pattern therein.

FIG. 6 illustrates a typical flow pattern for a five zone oven. The apparatus of FIG. 6 is identical to that of FIG. 1, except fewer zones are illustrated in FIG. 6 than in FIG. 1, and like numbers are used for like parts, where applicable. As can be seen, the closures and valves are adjusted in each zone so that there is a net flow of unheated, external gas into the soak zones, and a net flow of gas within the oven from the soak zones into both the ramp zone and the spike zone. In addition, there is a net inflow of gas into both the entrance and exit of housing 20 to prevent the escape of any noxious fumes. By injecting unheated gas into the soak zones, these zones are cooled, permitting the temperature to be more carefully controlled by raising the temperature of the gas using the heater plates. The flow of gas from the soak zones to the ramp and spike zones minimizes heat transfer from either the spike or ramp zones to the soak zones. Overheating of the soak zones is thereby prevented, and any requirement for refrigeration is obviated.

The oven of FIG. 6 has five separate heating zones, zones 80, 82, 84, 86 and 88. Each zone preferably is identical in structure to each other zone, and to zone 30 as illustrated in FIG. 2. Each of zones 80–88 includes a fan 36 and 37, and top and bottom chambers 42 and 43 respectively. Zone 80 has a lower intake port 90 and an upper exhaust port 92. Zone 82 has a lower intake port 94 and an upper exhaust port 96. Zone 84 has a lower intake port 100 in an upper exhaust port 102. Zone 86 has a lower intake port 104 and an upper exhaust port 106. Finally, zone 88 has a lower intake port 108 and an upper exhaust port 110. Zone 80 has upper closures 111 and 112, and lower closures 113 and 114. Zone 82 has upper closures 115 and 116, and lower closures 117 and 118. Zone 84 has upper closures 120 and 122 and lower closures 124 and 126. Zone 86 has upper closures 128 and 130, and lower closures 132 and 134. Finally, zone 88 has upper closures 136 and 138 and lower closures 140 and 142.

In a preferred embodiment for a five zone oven, zone 80 is a preheat or ramp zone in which the temperature of the heater plates 50 and 51 is high to cause the temperature of the board and the components to rise as quickly as possible. Zone 82 and zone 84 are both soak zones in which the temperatures of the heater plates 50 and 51 are lower than the temperatures of the heater plates 50 and 51 in zone 80, reducing the heating rate of the board and the components, and permitting the temperatures of the various components and boards to equalize. Zone 86 is a spike zone in which the temperatures of the heater plates 50 and 51 are higher than the temperatures of the heater plates 50 and 51 in soak zone 82 or 84 and in which the solder temperature is increased to a point above the solder liquidus temperature to cause the solder to reflow. Finally, zone 88 is a cooling zone in which the heater plates 50 and 51 are not activated, and fans 36 and 37 merely bring in unheated gas for cooling of the board and its components.

FIG. 6 shows five separate zones, for purposes of illustration only. It is to be understood that a greater or lesser number of zones could be used in conjunction with this invention. In addition, more than one zone could be used for the ramp portion of the temperature recipe, while only one zone or more than two zones could be used for the soak portion. Similarly, more than one zone could be used as spike zone and more than one cooling zone could be provided.

In FIG. 6, the net gas flow is from cooler zones into hotter zones. As can be seen from the flow arrows, there is a net flow of gas out of the soak zones 82 and 84 and into the preheat zone 80 and the spike zone 86. In addition, there is a net flow of gas out of cooling zone 88 and into spike zone 86. Finally, there is a net flow of gas into the entrance of the housing 12 and into zone 80 and a net flow of gas into exit 154 of housing 20 and into zone 88.

This net flow of gas is accomplished, in an exemplary embodiment, as follows. The valve associated with intake port 90 is closed, so that no fresh gas is injected into zone 80. The valve associated with exhaust port 92 is completely open, allowing gas to escape at a desired rate. All of closures 111, 112, 113 and 114 are left fully open, so that the return flow of gas to fans 36 and 37 in zone 80 is uniform on both sides of the fan. In zone 82, the valve associated with intake port 94 is at least partially open, while the valve associated with exhaust port 96 is fully closed. Closures 115 and 117 are opened fully. Both of closures 116 and 118 are fully closed. Thus, gas flows from zone 82 to the left, as shown in FIG. 6, or towards zone 80. In zone 84, the valve associated with intake pipe 100 is at least partially open, while the valve associated with exhaust port 102 is closed. Closures 120 and 124 are fully closed, while closures 122 and 126 are fully open. As a result, gas is directed from left to right, as shown in FIG. 6, and into zone 86. In zone 86, all of closures 128, 130, 132 and 134 are open, so that gas is uniformly circulated throughout the zone. However, intake port 104 is closed, while exhaust port 106 is fully open. Thus, gas is drawn into zone 86 from surrounding zones and is exhausted through port 106. In cooling zone 88, intake port 108 is fully opened, while exhaust port 110 is fully closed. Both of closures 136 and 140 are open, while closures 138 and 142 are fully closed. Gas is caused to move from right to left within zone 88, as shown in FIG. 6, and gas is drawn into zone 88 through port 108 and through exit 154 of housing 20.

In an alternative embodiment, exhaust ports 96 and 102, in zones 82 and 84, respectively, could be opened partially and still produce the desired effect. In addition, the closures in zones 82 and 84, namely closures 115, 116, 117, 118, 120, 122, 124 and 126 could each be partially opened or closed to provide the desired balance to the gas flows and to adjust the volume of the flow.

The valves utilized in the exhaust and intake ports can be any known flow restrictor. In one embodiment, plugs with the desired aperture are inserted into the ports to provide the desired gas flow. If it is desired to close the intake or exhaust port entirely, the plug inserted has no aperture. If it is desired to have the exhaust or intake ports fully opened, no plug at all is inserted.

Figure 7:
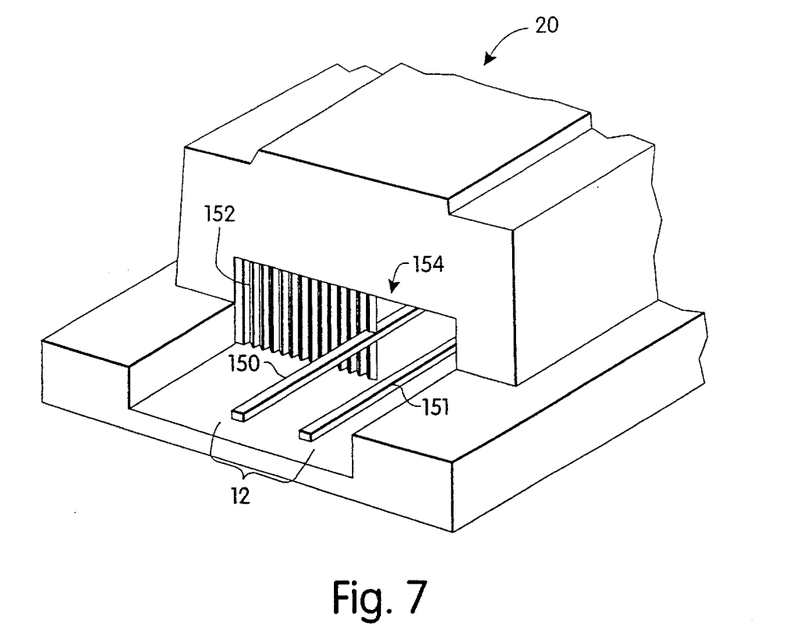
FIG. 7 is an isometric end view of the apparatus of FIG. 1 showing the baffle adjacent the cooling zone.

FIG. 7 illustrates exit 154 to housing 20. In one embodiment, conveyor 12 travels along rails 150 and 151 as shown. Rail 150 typically is slidable toward and away from fixed rail 151 to adjust the system for boards of varying sizes. To minimize the escape of heat and/or entrance of air from the interior of housing 20, a sliding baffle 152 may be provided in association with rail 150. Rails 150 and 151 may be offset slightly from the center of the housing so that baffle 152 covers as much of the opening of exit 154 as possible. Baffle 152 typically is adjustable so that it can be expanded or retracted as needed when moving associated rail 150 to cover the open area in exit 154 to the left of rail 150, as shown in FIG. 7.

Figure 8:
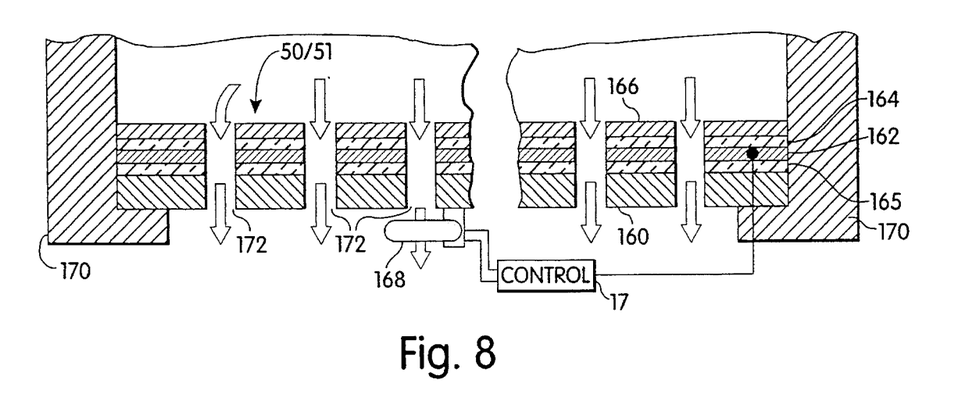
FIG. 8 is a cross-sectional side view of the heating plate found in each heating zone of the apparatus of FIG. 1.

FIG. 8 illustrates an exemplary heater plate 50 or 51 as used in the apparatus of this invention. It should be understood that heater plates 50 and 51 are identical in every respect. Each heater plate 50 or 51 includes a plate 160, a heater element 162, a top plate 166, and a layer 164 of electrical insulation between element 162 and plate 166 and a layer 165 of electrical insulation between element 162 and plate 160. A thermocouple 168 is clamped on plate 160 over one of holes 172. Thermocouple 168 is connected to control 17 for regulation of the temperature of the gas stream. Plates 160 and 166, layers 164 and 165 and element 162 are formed as a sandwich captured between two retaining members 170. Heater element 162 is coupled to control 17 which regulates the power supplied to element 162 to control the temperature of gas passing through plate 50 or 51.

Typically, plate 166 is formed of a metal having a relatively high emissivity and conductivity, such as aluminum. In a preferred embodiment, heater element 162 is a metal foil into which a pattern has been etched using conventional techniques. Plate 160 also is formed of a high emissivity material and absorbs energy from heater element 162 and radiates the energy as infrared radiation within the desired wavelength range. Typically, plate 160 is formed of anodized aluminum. Plate 160 always faces conveyor 12, so that the radiation emitted by plate 160 impinges directly on the PCB's on conveyor 12. In a preferred embodiment, layers 164 and 165 are formed of thin layers of mica.

As can be seen from FIG. 8, plates 50 and 51 contain a large number of holes 172 passing therethrough. Gas within chamber 42 or 43 is forced through holes 172 and past thermocouple 168 by respective fan 36 or 37. As the air or other gas passes through holes 172, it is heated by plate 50 or 51, including heating element 162 and plate 160.

Figure 9:
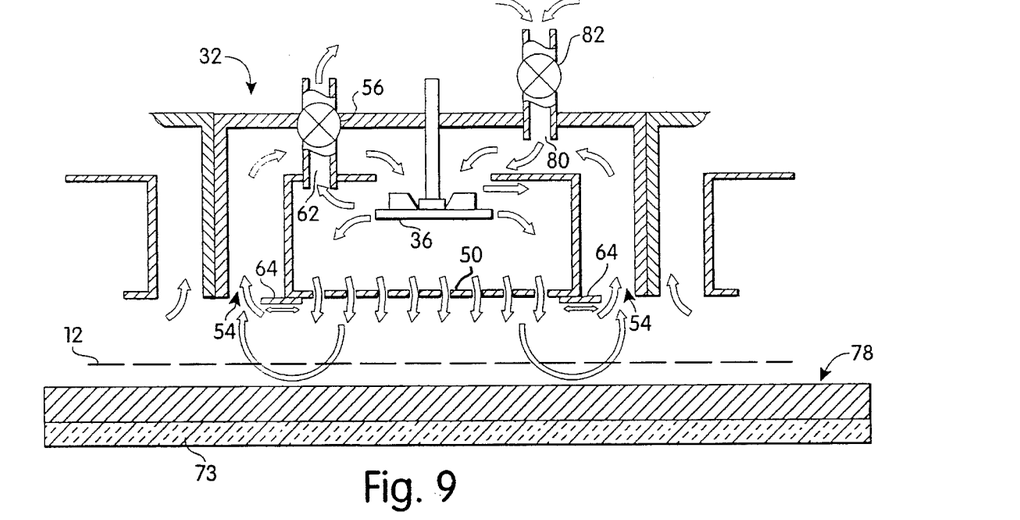
FIG. 9 is a cross-sectional side view of another alternative embodiment of a heating zone of the apparatus of FIG. 1.
Figure 10:
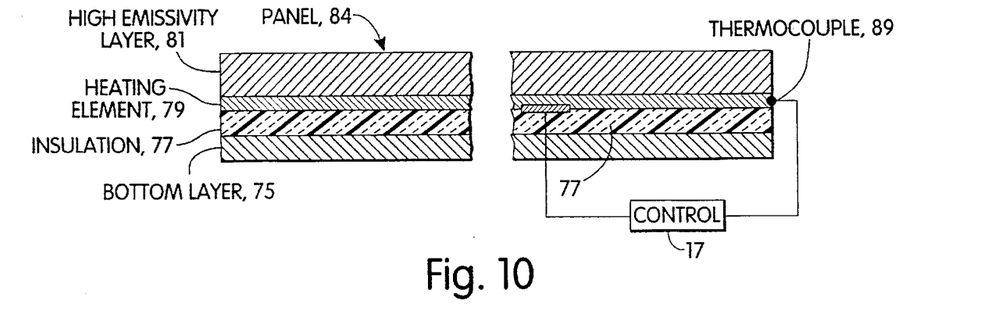
FIG. 10 is a cross-sectional side view of an alternative embodiment of the plate of FIG. 9.

Other zone configurations are shown in FIGS. 9 and 10. Like numbers are used for like parts, where applicable. In FIG. 9, upper cell 32 is identical to upper cell 32 as previously described in respect to FIG. 2, except that an intake port 80 is provided which is substantially identical to intake port 66 of FIG. 4. A valve 82, which is otherwise identical to valve 68 of FIG. 4, controls the amount of incoming gas. Instead of a lower heater, a metallic, highly reflective plate 78 having low thermal mass is provided below conveyor 12. Typically, this plate is formed of thin stainless steel. A layer of insulation 73 also is provided adjacent the lower surface of plate 78. Gas exiting heater plate 50 impinges on plate 78 and is directed upwardly toward fan 36 through apertures 54. Flow direction can again be controlled by closures 64, and by valve 56 in exhaust port 62 and valve 82 in intake port 80.

With reference now to FIG. 10, panel 84 is an alternative embodiment of plate 78 of FIG. 9. In some applications, panel 84 may be substituted for plate 78 beneath conveyor 12 and below cell 32. Panel 84 emits infrared radiation for heating of the product load. Panel 84 typically includes a high emissivity layer 81, such as an anodized aluminum plate, a heating element 79 coupled to control 17, a layer of insulation 77 and a bottom layer 75. A thermocouple 89 coupled to control 17 measures the temperature of heating element 79. Panel 84 operates in substantially the same manner as plates 50 and 51 except no gas is forced through holes therein. PCB's disposed on conveyor 12 are heated by infrared radiation from panel 84, by infrared radiation from heater plate 50 and by hot gas passing through heater plate 50. Plate 84 of FIG. 10 is particularly useful in high heat zones where insufficient heat can be provided by upper cell 32 alone.

Figure 11:
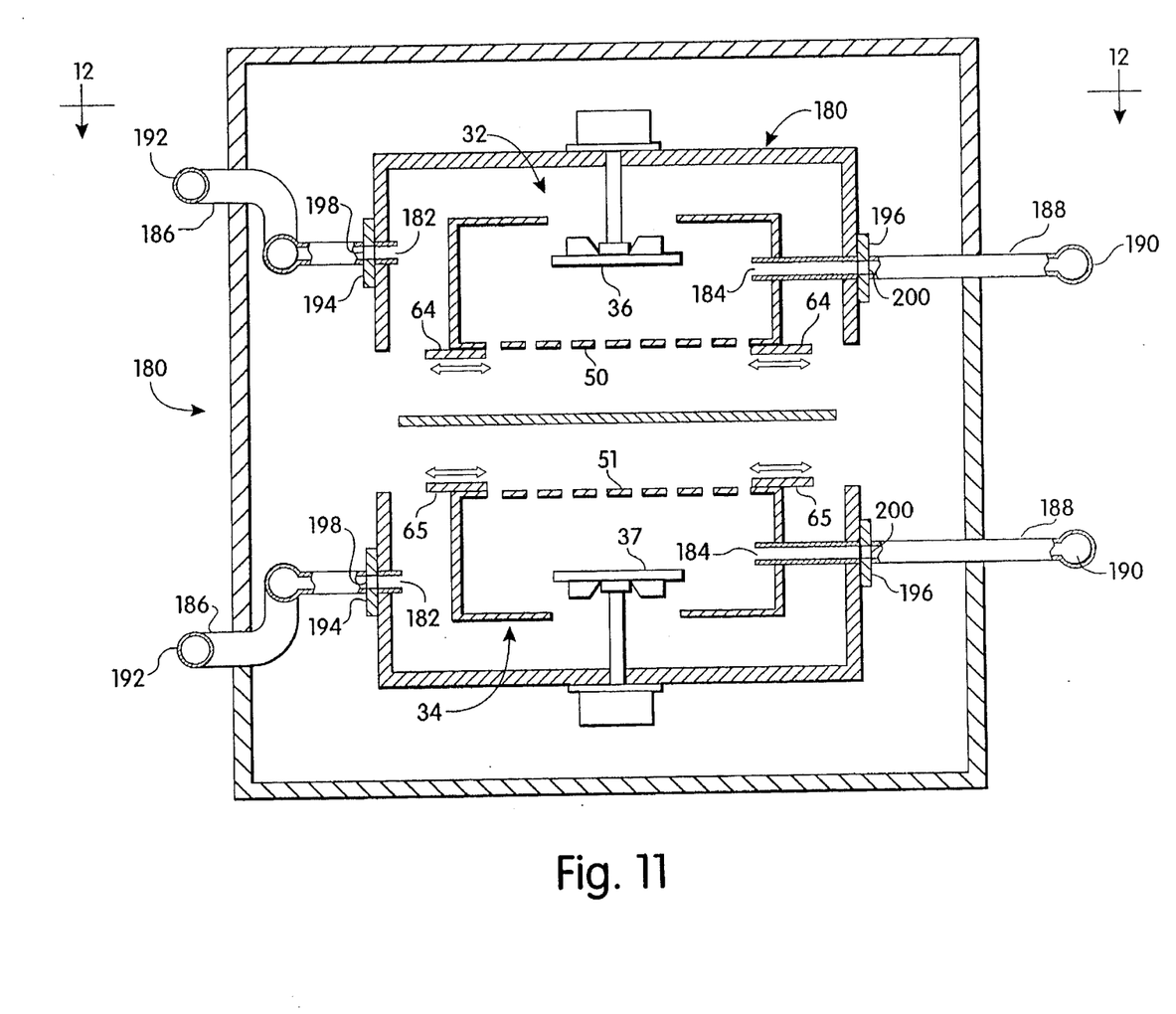
FIG. 11 is a cross-sectional end view of an alternative embodiment of the apparatus of FIG. 1.
Figure 12:
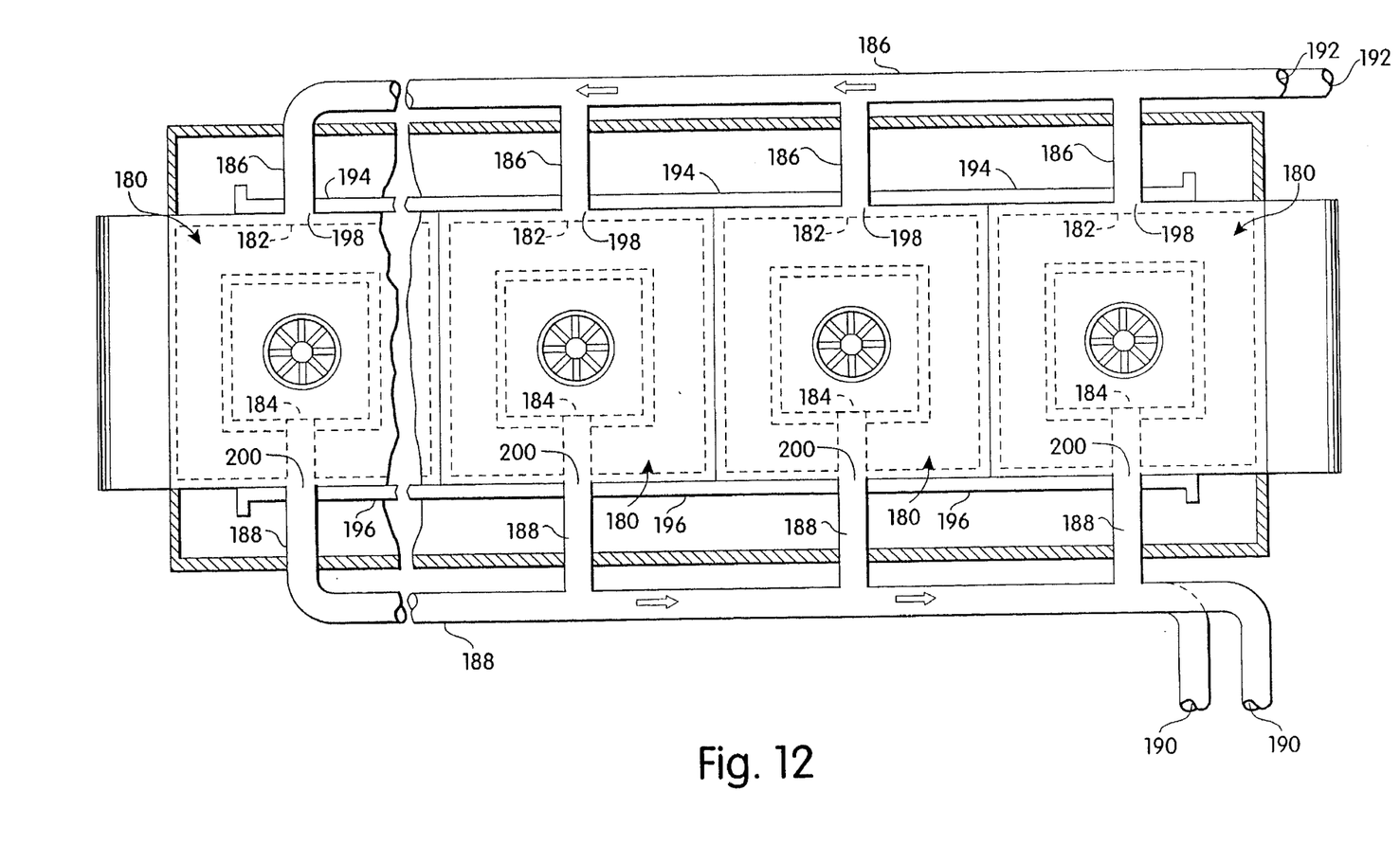
FIG. 12 is a cross-sectional top view of the apparatus of FIG. 11.

FIGS. 11 and 12 illustrate another embodiment of this invention. A multizone oven is shown in FIGS. 11 and 12 having a plurality of identical heating or cooling zones 180. In this embodiment, the intake ports 182 and exhaust ports 184 for each zone are disposed on the sides of the chambers defining the zone, rather than on the top and bottom as shown in FIGS. 1 and 2. Associated with intake ports 182 is an intake manifold 186, which is in direct gaseous communication with each intake port 182. Similarly, associated with exhaust ports 184, is an exhaust manifold 188 which is in direct gaseous communication with each exhaust port 184. Gas is introduced into the system through port 192 in manifold 186, while gas is exhausted from the system through port 190 in manifold 188. Associated with manifold 186 is a slide 194 having a plurality of openings 198. Each opening is associated with an intake port 182. By moving slide 194, openings 198 can be adjusted with respect to ports 182. In this manner, ports 182 can be simultaneously opened, closed or otherwise adjusted as desired. This feature does not permit independent control of the gas flow through ports 182, but allows simultaneous and rapid adjustment of the flow of gas into the system through all of ports 182. A similar slide 196 is provided in association with manifold 188. Slide 196 has a plurality of openings 200, each of which corresponds to one of ports 184. Similarly, by movement of slide 196, the rate of flow of gas exhaust through ports 184 can be controlled simultaneously for all zones.

Typically, manifold 186 and associated slide 194, as well as manifold 188 and associated slide 196 are provided for each set of upper cells 32, while identical manifolds 186 and 188, and slides 194 and 196 are provided for each set of lower cells 34, as shown in FIG. 11. Cells 32 and 34 are otherwise substantially identical to cells 32 and 34 of FIG. 2.

The apparatus of this invention provides improved zone definition, better control of the temperatures within each zone and, thus, improved performance over existing apparatus. By providing for controlled intake and exhaust in each zone, in combination with the adjustable closures for the return flow of gas to both the upper and lower cells 32 and 34, the flow between zones and within each zone can be controlled to prevent heating of cooler zones by adjacent hotter zones. In addition, by providing a cold gas intake in each zone, zones in which temperatures are too high can be rapidly cooled to the desired level, and no refrigeration is required. By controlling the flows between the zones, the required zone definition is provided, thus permitting careful temperature control within each zone.

By making each zone physically identical to each other zone in structure, the user is permitted to alter the zone configuration and even change a heating zone to a cooling zone, or vice versa, without any change in the apparatus. The necessary adjustments can be made by adjusting the temperatures of the heater plates, and by adjusting the positions of the closures and the valves associated with each exhaust and intake port. Moreover, the oven can be readily converted to the use of pure nitrogen, or some other gas by the user with no alteration in the basic structure.

In view of the above description, it is likely that modifications and improvements will occur to those skilled in the art which are within the scope of this invention. The above description is intended to be exemplary only, the scope of the invention being defined by the following claims and their equivalents.

What is claimed is:

1. A method for soldering surface mounted devices to a printed circuit board, said method comprising the steps of:

conveying a printed circuit board with devices and solder disposed thereon sequentially through a plurality of heating zones in an oven;

heating the printed circuit board and the devices in each of the plurality of zones in sequence, the gas temperatures in some of the heating zones being cooler than gas temperatures in others of the heating zones having higher gas temperatures; and controlling a flow of gas between the heating zones in the oven to produce a net flow of gas out of the heating zones having cooler gas temperatures and into zones having higher gas temperatures.

2. A method for soldering surface mounted devices to a printed circuit board, said method comprising the steps of:

conveying a printed circuit board with devices and solder disposed thereon through an oven having a plurality of heating zones;

heating the printed circuit board and the devices in a first zone having a first gas temperature;

heating the printed circuit board and the devices in a second zone having a second gas temperature, said second gas temperature being lower than said first said gas temperature;

heating the printed circuit board and the devices in a third zone having a third gas temperature, said third gas temperature being higher than said second gas temperature;

introducing gas into the second zone from a source external of the second zone at a temperature below said second gas temperature;

exhausting gas from the first and third zones;

introducing less gas into the first and third zones than into the second zone; and exhausting less gas from the second zone than from the first and third zones.

3. The method as recited in claim 2 further comprising the steps of:

conveying the printed circuit board and the devices through a fourth, cooling zone after heating the board and devices in the third zone;

introducing gas from a source externally of the oven into said fourth zone;

allowing the gas within the fourth zone to pass from the fourth zone into the third zone; and preventing gas in the third zone from passing into the fourth zone.

4. A method for soldering surface mounted devices to a printed circuit board, said method comprising the steps of:

conveying a printed circuit board with devices and solder disposed thereon through an oven having a plurality of heating zones;

heating the printed circuit board and the devices in a first zone having a first gas temperature;

heating the printed circuit board and the devices in a second zone having a second gas temperature, said second gas temperature being lower than said first gas temperature;

heating the printed circuit board and the devices in a third zone having a third gas temperature, said third gas temperature being higher than said second gas temperature;

preventing gas from the first and third zones from flowing into the second zone;

recirculating gas within each of the first, second, and third zones; and controlling the recirculation of gas in the first, second and third zones;

said controlling step including the step of directing gas from the second zone into the first and third zones.

5. A method for soldering surface mounted devices to a printed circuit board, said method comprising the steps of:

conveying a printed circuit board with devices and solder disposed thereon sequentially through a plurality of heating zones in an oven;

heating the printed circuit board and the devices in each of the plurality of zones in sequence, some of the zones having lower gas temperatures than others of the zones having higher gas temperatures;

introducing more gas into the zones having lower gas temperatures than into the zones having higher gas temperatures; and exhausting less gas from the zones having lower gas temperatures than is exhausted from the zones having higher gas temperatures.

6. A method for heating of a product load, said method comprising the steps of:

conveying the product load sequentially through a plurality of heating zones in an oven;

heating the product load in each of the plurality of zones in sequence, some of the zones having lower gas temperatures than other zones having higher gas temperatures;

in each zone, circulating heated gas past the product load utilizing a gas circulation mechanism disposed in that zone, the gas circulation mechanism having a low pressure side and a high pressure side;

introducing into each of the zones unheated gas from a source outside of the zone;

separately regulating in each zone a volume of gas being introduced in said introducing step;

exhausting from each of the zones to a location external of the zones heated gas from within each zone; and separately regulating in each zone a volume of gas being exhausted in said exhausting step.

7. The method as recited in claim 6 further comprising the steps of:

in each zone, returning through a return channel to the low pressure side of the gas circulation mechanism heated gas circulated by the gas circulation mechanism past the product load; and in each zone, controlling the volume of gas entering the return channel and being returned to the low pressure side of the gas circulation mechanism.

8. The method as recited in claim 6 wherein said introducing step includes the step of introducing gas to the low pressure side of the gas circulation mechanism in each zone.

9. The method as recited in claim 6 wherein said exhausting step includes the step of exhausting gas from the high pressure side of the gas circulation mechanism in each zone.

10. The method as recited in claim 6 further comprising the step of exhausting gas from a location between two adjacent zones to a location external of the two adjacent zones.

11. A method for heating of a product load, said method comprising the steps of:

conveying the product load sequentially through a plurality of heating zones in an oven;

heating the product load in each of the plurality zones in sequence;

within each zone, circulating gas past the product load utilizing a gas circulation mechanism having a low pressure side and a high pressure side;

within each zone, separately heating the gas within that zone which is expelled toward the product load by the gas circulation mechanism;

conducting gas expelled toward the product load in a return channel backed to the low pressure side of the gas circulation mechanism; and controlling the volume of gas passing through the return channel to the low pressure side of the gas circulation mechanism.

12. The method as recited in claim 11 further comprising the steps of:

exhausting gas from the high pressure side of the gas circulation mechanism in each zone; and separately regulating in each zone a volume of gas being exhausted in said exhausting step.

13. The method as recited in claim 11 further comprising the steps of:

introducing into each zone on a low pressure side of the gas circulation mechanism unheated gas from a source outside of the zone; and separately regulating in each zone a volume of gas being introduced in said introducing step.

14. A method for heating of a product load, said method comprising the steps of:

conveying the product load sequentially through a plurality of heating zones in an oven;

heating the product load in each of the plurality of heating zones of the oven in sequence;

in each zone, circulating gas within the zone from a low pressure side to a high pressure side of a gas circulation mechanism, gas from the high pressure side of the gas circulation mechanism being directed toward the product load;

in each zone, heating the gas which is directed from the high pressure side of the gas circulation mechanism toward the product load;

returning gas from the product load back to the low pressure side of the gas circulation mechanism;

selectively diverting gas from at least one of the zones to other adjacent ones of the zones, said diverting step comprising the steps of:

reducing the volume of gas returned from the product load to the low pressure side of the gas circulation mechanism in the one zone to an amount less than the volume of gas directed toward the product load; and selectively introducing unheated gas into the one zone and exhausting heated gas from the other adjacent zones.

15. A method for heating of a product load, said method comprising the steps of:

conveying the product load sequentially through a plurality of heating zones in an oven;

heating the product load in each of the plurality of heating zones of the oven in sequence;

in each zone, circulating gas within the zone from a low pressure side to a high pressure side of a gas circulation mechanism, gas from the high pressure side of the gas circulation mechanism being directed toward the product load;

in each zone heating the gas which is directed from the high pressure side of the gas circulation mechanism toward the product load, said heating step comprising the step of heating gas in first ones of the zones to gas temperatures higher than lower gas temperatures to which gas is heated in second ones of the zones;

in each zone, conducting gas from the product load back to the low pressure side of the gas circulation mechanism;

exhausting gas selectively from the high pressure side of the gas circulation mechanism in each of the first ones of the zones;

selectively introducing unheated gas from a source outside of the zones to the low pressure side of the gas circulation mechanism in each of the second ones of the zones.

* * * * *